(12) United States Patent
Fox et al.

(10) Patent No.: US 6,888,569 B2
(45) Date of Patent: May 3, 2005

(54) METHOD AND APPARATUS FOR TRANSMITTING A DIGITAL PICTURE WITH TEXTUAL MATERIAL (75) Inventors: Harry Fox, Jerusalem (IL); Jacob Benjamin, Jerusalem (IL); Ronnie Wulfson, Jerusalem (IL)

(73) Assignee: C3 Development, LLC, Garden City, NY (US)

( * ) Notice: Subject to any disclaimer, the term of this patent is extended or adjusted under 35 U.S.C. 154(b) by 9 days.

(21) Appl. No.: 10/261,409

(22) Filed: Oct. 2, 2002

(65) Prior Publication Data

US 2004/0066459 A1 Apr. 8, 2004

(51) Int. Cl.⁷ .............................................. H04N 5/262
(52) U.S. Cl. .................................. 348/239; 348/231.3
(58) Field of Search ..................... 348/207.1, 231.99, 348/231.2, 231.3, 231.4, 231.5, 231.6, 552, 239

(56) References Cited

U.S. PATENT DOCUMENTS

| | | | | | |
|---|---|---|---|---|---|
| 5,528,293 | A | * | 6/1996 | Watanabe | ................ 348/231.2 |
| 5,805,215 | A | * | 9/1998 | Mizoguchi | ................ 348/231.5 |
| 5,973,734 | A | * | 10/1999 | Anderson | .................... 348/239 |
| 6,014,170 | A | * | 1/2000 | Pont et al. | ................ 348/231.4 |
| 6,154,576 | A | * | 11/2000 | Anderson et al. | ........... 382/269 |
| 6,445,460 | B1 | * | 9/2002 | Pavley | ...................... 358/1.15 |
| 6,483,540 | B1 | * | 11/2002 | Akasawa et al. | ........... 348/239 |
| 6,556,243 | B1 | * | 4/2003 | Dotsubo et al. | ......... 348/231.2 |
| 6,683,649 | B1 | * | 1/2004 | Anderson | ............. 348/333.05 |
| 6,704,047 | B1 | * | 3/2004 | Tsutsui | .................... 348/231.7 |

* cited by examiner

Primary Examiner—Aung Moe
Assistant Examiner—Jacqueline Wilson
(74) Attorney, Agent, or Firm—Bernard Malina; Malina & Associates, PC (57) ABSTRACT

A method and system for incorporating textual and audio material into a JPEG file in a manner allowing both a photograph and the textual material to be stored as one unit and transferred as one unit. The textual materials stored in various photograph tag markers which become part of the JPEG file. The JPEG file including the textual material can be transferred to an authorized user who could edit the file based upon password security. The textual materials can appear around any of the borders of the photographs or can be directly embedded into the photograph.

28 Claims, 6 Drawing Sheets

METHOD AND APPARATUS FOR TRANSMITTING A DIGITAL PICTURE WITH TEXTUAL MATERIAL

FIELD OF THE INVENTION

The present invention relates to a method and apparatus for appending textual material to JPEG files and transferring these files to a remote source.

BACKGROUND OF THE INVENTION

The current technology on the market permits cameras to take digital or non-digital pictures, and attach date and time stamps to the picture. The date and time stamps become permanent non-modifiable information that is either attached to the developed picture of pasted as pixels into a digital picture. This implies that if a particular viewer of the picture does not want to view the additional data attached to the picture, they will not have the opportunity to do so. Furthermore, if someone wants to modify or remove that data, that is also not possible.

Other current technologies exist that permit users to add captions to their digital pictures. However, these captions are stored in a database on a local machine or Internet site. If the user wants to move a picture from one environment to another, or send digital pictures to other users, then the caption does not move with the picture. Furthermore, if a sound file was attached to the JPEG file, the same problems would exist with respect to transmitting both the photograph and the sound.

Several U.S. patents have issued generally relating to the subject matter of transferring JPEG files. For example, U.S. Pat. No. 6,014,170, issued to Pont et al is directed to an information processing apparatus which stores information in recording units. Each recording unit includes at least one of a main image data, a sub-image data, and audio data. As illustrated in FIG. 5, the main image data, sub-image data as well as the audio data are stored in a random access memory in a mixed form. The main image data includes header information and image data. The header information includes index information, information indicating the type of data, information indicating the date when the image was taken, information indicating the start address of an area in which the data was stored, and information indicating the data length of the image data. The data structure for the sub-image data would be similar to the image structure of the main image data. However, this patent does not describe a situation in which when data is transferred from one location to a second location, such information such as textual data or other types of captioned material could be altered by an authorized user.

U.S. Pat. No. 5,805,215, issued to Mizoguchi shows an information processing method and apparatus utilizing a notebook-type electronic camera. Various information relating to a particular image, such as the date of the image is automatically recorded along with the image data.

U.S. Pat. No. 5,170,253, issued to Horiuchi et al illustrates an apparatus for superimposing a title onto an image produced by a video camera. A title to be displayed is elected by a control signal from a control signal input terminal. Both the patents to Mizoguchi and Horiuchi et al, while discussing adding material to a digital photograph, neither of these patents suggest a manner for insuring that only authorized individuals could alter the non-photographic material after it is sent from a first location to a second location.

It will be appreciated from the foregoing that there is still need for improvement in a system and method of attaching non-photographic material to a photograph, transmitting both the photographic and non-photographic material and allowing only authorized individuals to modify the non-photographic material at a second location remote from a first location.

SUMMARY OF THE INVENTION

The deficiencies of the prior art are addressed in the present invention which would allow individuals to take digital pictures and attach textual data to the picture file itself so that the data will accompany the picture wherever it goes. If it is sent through the Internet or any other medium, the accompanying text, or, additionally, an audio file, is always attached to the digital picture both in the picture itself and as an ASCII text so that it is capable of being edited and displayed. Information provided in a JPEG marker would include a password allowing only a certain individual or individuals to edit the digital, non-picture material. Furthermore, the present invention would allow individuals to modify certain information in the digital picture, but not allow modification of other information in the picture. Additionally, the present invention would allow certain individuals to modify one type of information and other individuals to modify a different type of information.

The text/audio material that is attached to the picture will be viewable/playable for anyone that receives the picture. The user would determine exactly where and how this text will be displayed with the photograph. The textual material can be produced as a caption displayed around any of the borders of the picture or could be directly included in the picture itself by overlaying certain pixels of the picture. However, only those having the appropriate photograph tags application will be permitted to modify the text if they so desire, providing that the owner of the picture has sent permission to allow this. Furthermore, based upon the password or passwords included in the application, certain individuals would have the ability to modify all of the textual/audio material, while other individuals could only edit a portion of this material.

Other individuals that receive the photograph would not require any special technology to view the captions or other types of data that is attached to the photograph, since the creator of the additional data and/or sound will attach this additional information as part of the digital photograph. The non-photographic material will be provided in the digital photographic file in its raw form, so that if the creator requires modification of a text, this will be possible.

Furthermore, since the actual textual/audio data will be stored inside the JPEG file, it will now be possible to search all of one's photographs on their personal computer or other device for textual data. For example, if textual material, such as the location of a photograph is added to the digital photograph, the owner of these photographs could search for only those photographs which were taken at a certain location or of a particular individual. Furthermore, if a number of photographers sent captioned material to a news organization, such as a newspaper, this organization could search for all of the photographs submitted by a certain photographer, or on a certain subject, or by the date of the picture. The combination that could be searched would vary with the type of material stored in the JPEG file.

It would now become possible based upon the present invention to make each picture into a separate database suppository of data that describes attributes about that picture, and when joined together with many other photograph tagged pictures, it becomes possible to build a database of pictures, where each picture has information describing the contents of the picture. Thus, when joined with many other pictures, this will form a database of pictures that can be searched and processed as a group or as individual pictures.

The application software utilized to produce the desired results of attaching textual captions and audio material directly to a digital photograph, viewing this photograph as well as editing this photograph would reside in many different devices, such as personal computers, hand-held computers or even cameras that will know how to edit and display this digital data in any form. The photography tagged technology would be published as a software developing kit preventing (SDK) so that third parties may integrate the concept of adding and editing textual and audio captions into digital photographs in their own products. The present invention extends the current market file format restoring digital pictures in the JPEG format by utilizing certain reserve tags in the JPEG file for adding the data required to store the metadata into the JPEG file for editing.

BRIEF DESCRIPTION OF THE DRAWINGS

The present invention will be understood and appreciated more fully from the following detailed description taken in conjunction with the appended drawings in which.

DETAILED DESCRIPTION OF THE INVENTION

Figure 1:
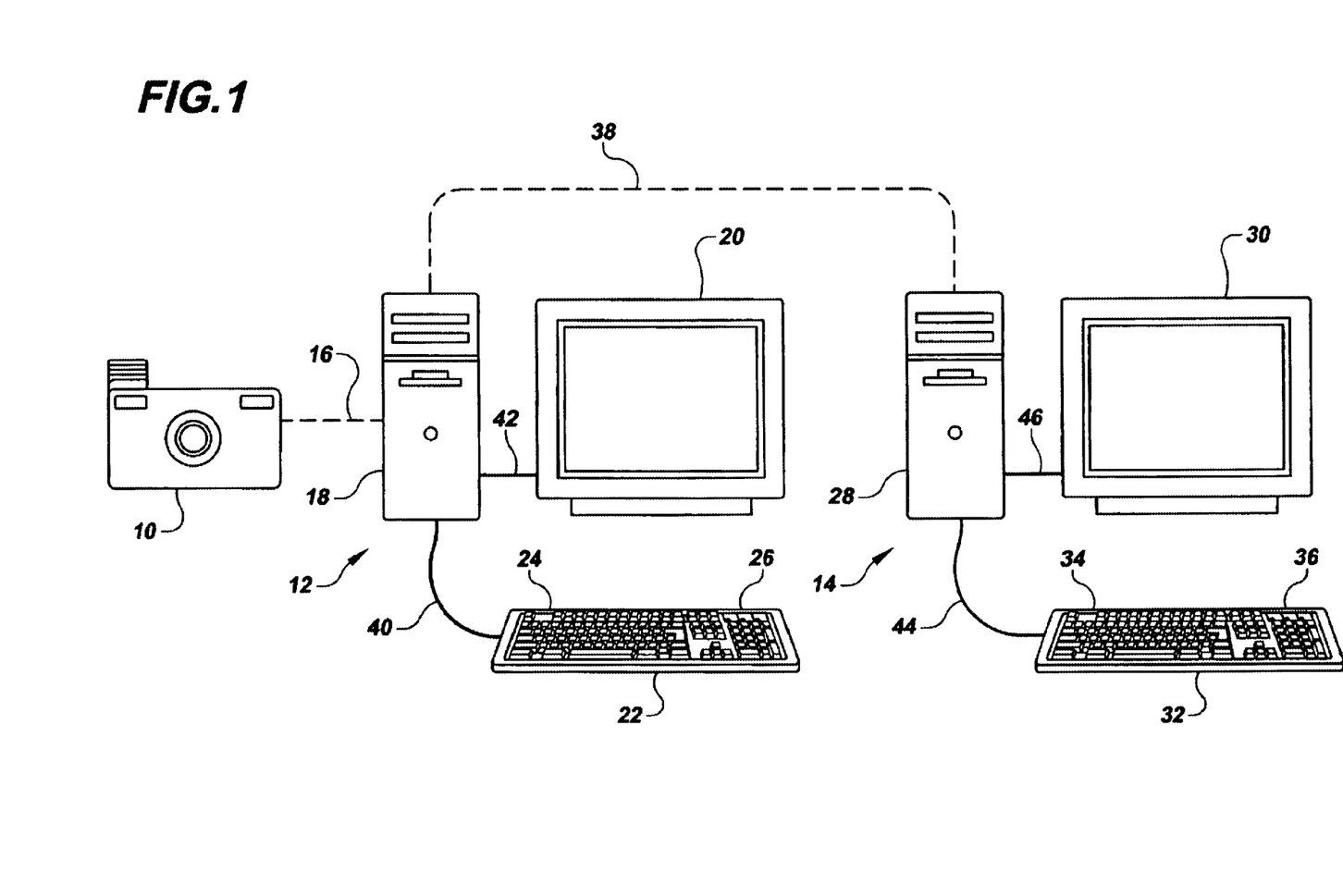
FIG. 1 is a block diagram of the environment of use in the present invention.

FIG. 1 illustrates the environment in which the present invention would operate. A picture is taken utilizing any type of standard digital camera 10. This digital picture is transferred to a first computer or similar input device 12 and is ultimately transferred to a second computer or a similar memory device 14. The digital picture is transferred to the hard drive 18 of the first digital computer 12 by any conventional means such as physically loading a disk into the hard drive 18 or by wired or wireless communication between the camera 10 and the hard drive 18. The computer is provided with a monitor 20 and keyboard 22. The keyboard 22 is provided with standard alphanumeric keys 24 as well as standard function keys 26. The keyboard 22 is connected to a standard memory contained in the hard drive 18 by a connection 40. The hard drive 18 is connected to the monitor 20 by connection 42.

Similar to the first computer 12, the second computer 14 includes a hard drive 28 provided with a memory therein, a monitor 30, as well as a standard keyboard 32 including standard alphanumeric keys 34 and standard function keys 36. The keyboard 32 is connected to the hard drive 28 via a communication line 44 and the display 30 is connected to the hard drive 28 via a communication line 46. Information is transmitted between the hard drive 18 of the first computer 12 and the hard drive 28 of the first computer 14 via any known communications link 38 such as a wired link, a wireless link as well as the Internet.

Figure 2:
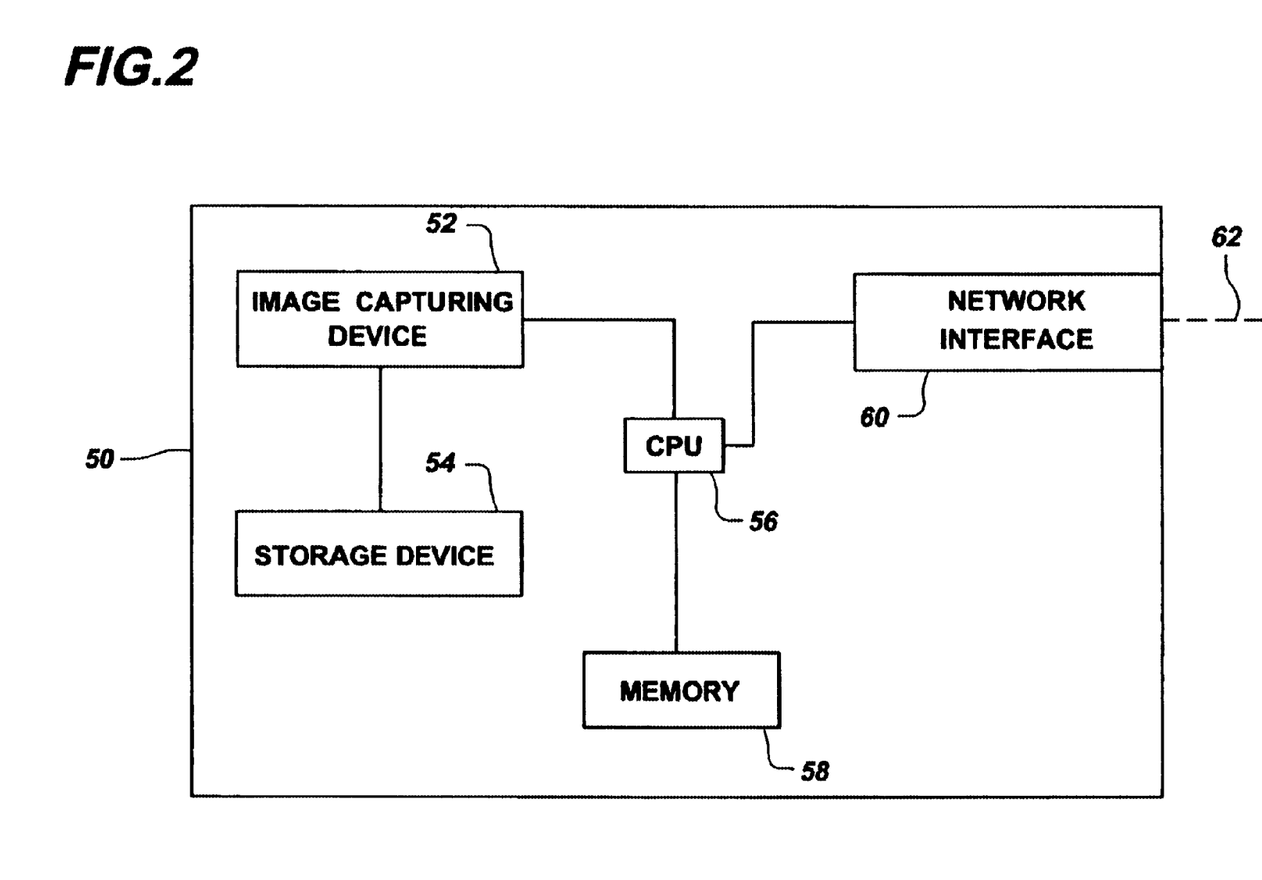
FIG. 2 is a block diagram showing the major components of a camera used to take digital photographs.

FIG. 2 broadly illustrates the operation features 50 of a standard digital camera 10. These features include an image capturing device 52 for capturing an image as well as a storage device 54 for capturing one or more images in a digital format. A CPU 56 controls the operation of the digital camera in concert with a memory 58. The information contained in the storage device 54 is then introduced to a network interface 60 for the purpose of transmitting the digital image or images to a communications network 62 such as the Internet or any other type of wired or wireless communication.

The purposed of the present invention is to allow a caption to be added to a photograph in such a manner that both the caption and the photograph are stored as one JPEG file such that the entire file can be transferred from one memory device such as a computer to a second memory device such as a computer. Additionally, the present invention would allow the textual information to be altered by an individual having permission from the person generating the photograph and appended captioned material. It is also noted that a caption need not be limited to textual material and could also include sound such as a verbal commentary for music or any other type of supporting sound to enrich the photograph. This sound file will be any standard sound file format such as WAV. Other types of textual material would include a caption describing the contents of the photograph, the photographer's name, a copyright notice as well as a time stamp. The photographer's name as well as the copyright notice would include as ASCII string with the name of the photographer as well as the copyright notice. It is also noted that the term "textual material" utilized with this invention would include one or more of the above-noted metadata attributes as well as any additional attributes which would fulfill the scope of the present invention. Furthermore, it is noted that the computer or memory device could also be a camera or cellular phone.

The above-noted textual attributes can be appended to the bottom of the photograph or embedded in any form directly in the photograph. Information relating to the position of the textual material would be included in the JPEG file. Furthermore, the present invention would allow the textual material to be displayed in various fonts, colors and sizes as well as a display angle in the digital photograph. Additionally, the X,Y position in the picture of any of the above-noted textual attributes as well as the rotation angle, background color (if the textual material is not embedded in the picture) as well as the text color, font name, font size and font style (any combination of bold, underline, italics or the like) would also be stored in the JPEG file format.

A standard JPEG format utilizes markers to break the JPEG file stream into its component structures. Each marker is two bytes in length with the first byte always having the value FF and the second byte containing a code that specifies the marker type. The JPEG standard is fairly flexible when it comes to ordering the markers within a file. The only rule that is employed is that each file must begin with a start of image (SOI) marker and end with an end of image (EOI) marker. In most cases, all other markers can appear in any order.

Figure 3:
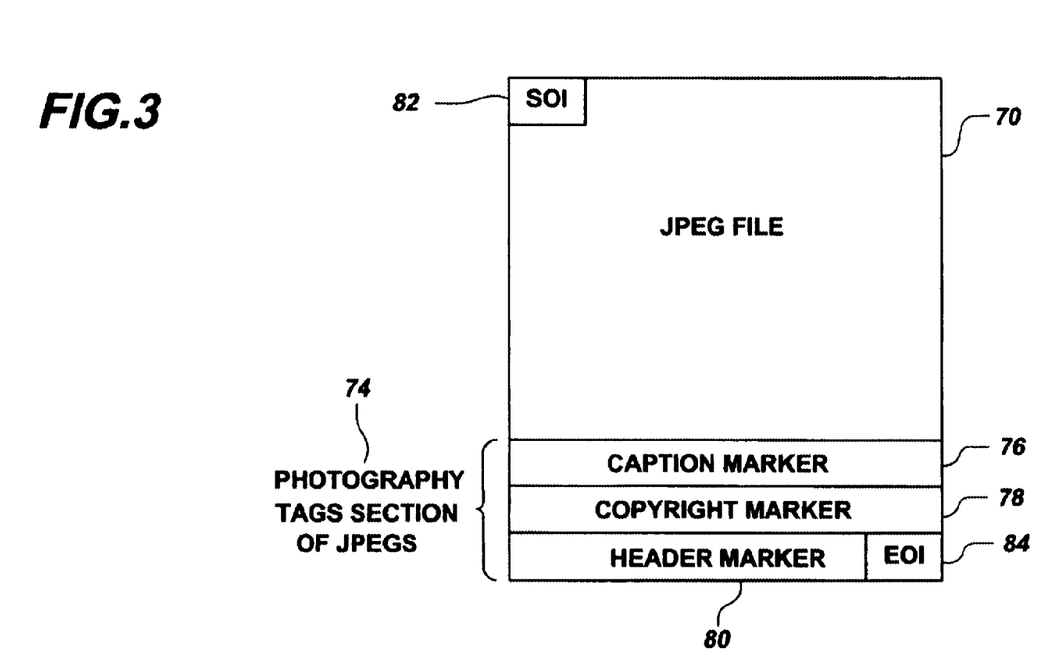
FIG. 3 is a diagram of a JPEG file showing textual material contained therein.

FIG. 3 would illustrate a typical JPEG file that would appear, for example, on the display 30 of the first computer 12 as well as the second computer 14. The JPEG file as depicted on the display would include a major portion 70 on which a digital photograph would appear. Appended to the bottom of the JPEG file photograph would be the photograph tag section of the JPEG 74. This section as illustrated in FIG. 3 would include a caption marker 76, a copyright marker 78 as well as a header marker 80. Other textual material such as the photographer's name as well as a description of the photograph could also appear in section 74. As previously indicated, the beginning of the JPEG file would include an SOI marker 82 and would end with the EOI marker 84.

The JPEG format supports general purpose markers for third party applications for a multitude of uses. The JPEG format contains a set of 16 markers designated as APP0-APP15 that are used to store application specific data. These markers would allow information beyond what is specified in the JPEG standard to be stored. Although it is unimportant which of these markers are utilized in the present invention, the photography tag for the present invention will store all of the relevant textual data in the APP10 marker. The JPEG file format does not require that any and all of these markers be used. They are merely definitions of markers that a standard application that opens and reads the JPEG file can ignore. Since they are used for application specific data, it is quite probable that most of the JPEG files will not have any APP markers.

The concept of assigning numbers to these APP markers gives 15 possible APP markers that may be used. The present invention has chosen to use the APP10 marker purely on an arbitrary basis. However, if another application decides to employ the APP10 marker for their own internal reasons, the APP 10 marker of the present invention will be differentiated from these other APP10 markers by the inclusion of a signature in the marker structure that is 8 bytes long.

The APP10 marker utilized in the present invention inside the JPEG file will contain basically the same data structure as shown in Table I.

TABLE I

| Data Item | Data Type | Description |
| --- | --- | --- |
| Marker | 2 Bytes | JPEG Marker (APP10) |
| Length of Data | Word | Length of the Data contained in this marker |
| Signature | 8 Bytes | Photography tags standard signature - "PhoTags" |
| Type | Byte | Type of Photography tag<br>1 - Header<br>2 - Non Display Data (text or other)<br>3 - Displayable Text Data |
| Data | Byte | The data bytes. The structure of the data will be expanded below for Header Marker and TextData marker types. For Sound type, the data is the raw sound bits. |

The photography tag application requires three types of markers, namely a header marker, a non displayable data marker and a displayable text data marker. The particular type of marker will be indicated in the type field in the header structure as shown in Table I.

The header marker 80 is the first one loaded by the photography tag software development kit (SDK) and will have a fixed size so that it can be accessed correctly. The structure of the header marker is shown in Table II. The header marker is used to point to the first photography tag marker in the file so that it can be quickly accessed rather than to scan all the markers in the file sequentially. The header marker also contains the height in bytes of an external caption area appended to the JPEG file if the user decides that the caption will not be embedded in the picture but displayed in an attached area 76 (see FIG. 3) under or above the picture. The header marker would also contain where the caption is positioned, a password or passwords allowing the protection of all of the data in the picture and allowing an individual to alter this data, the background color of the caption area, the current photography tag version number as well as the length of the structure so that it can support backwards compatibility. This is important since the length of the header is read as the first piece of data when the structure is loaded and is the last bit of the header structure located just before the JPEG EOI tag. The header marker also contains the particular photography tag version number being utilized.

TABLE II

| Data Item | Data Type | Description |
| --- | --- | --- |
| PtrToFirstMarker | DWord | A pointer to a location in the file that contains the first photograph tag |
| HeightOfCaption | Word | Height in bytes of external caption area, zero if not used |
| CaptionPosition | Byte | 1 - Top<br>2 - Bottom<br>3 - Right<br>4 - Left |
| Password | Char(8) | 8 character password that allows protection of all data in the picture |
| Frame Width | Word | If the user wants to attach a frame to the photo, then this number is greater than 0. The number will determine the width of the frame in pixels. |
| BackgroundClr | DWord | Color of background for caption area if used |
| VersionNo | Word | Version of the current photograph tag |
| LengthOfHdr | Word | Length of this structure. So we can support backwards compatibility |

The non displayable data marker can hold any form of data for a single element and would include the concept of open field names. This means that the application can create its own field types. As shown in Table III, these internal fields could contain but are not limited to the type of caption, the name of a photographer, the copyright notice, the date of the photograph, a textual description as well as sound. Other types of fields such as a price of the photograph could also be included. The structure of the non displayable data marker is shown in Table III. This data marker allows a user to store any form of the data in the JPEG file that is not used for displaying. This data can be used for searching various items in this database. It is important to note that this data need not be textual and would also include sound data. This is important since the searching capacities of the present invention would then not be limited to just textual data but would also include the possibility of searching the audio data. Various input devices associated with the present invention such as voice recognition devices can be employed in this searching process.

TABLE III

| Data Item | Data Type | Description |
| --- | --- | --- |
| Data Type | 1 byte | The type of data to be held:<br>1 - Text<br>2 - Integer<br>3 - Floating point numeric<br>4 - Date<br>5 - Byte stream (used for sound) |
| Field Name | Text | Name of the field (e.g., Caption, Price, etc.) |
| Data Length | Word | The length of the data |
| Data | Depends on the type described in the Data Type | The actual data that is stored |

The caption marker 76 as well as the copyright marker 78 is stored in the JPEG file in front of the header marker 80. The types of textual data which is stored in this file could include a caption, a time stamp, the name of the photographer, a copyright notice as well as a sound commentary. The structure of the test data marker is shown in Table IV. If the text is to be embedded into the JPEG file picture, it stores the bits of the picture before the overlay so that it may support editing and rebuilding of the old picture, if needed. All of the text fields are designed to be of variable length, thereby requiring that there be a length field proceeding each of the text field data attributes.

Figure 7:
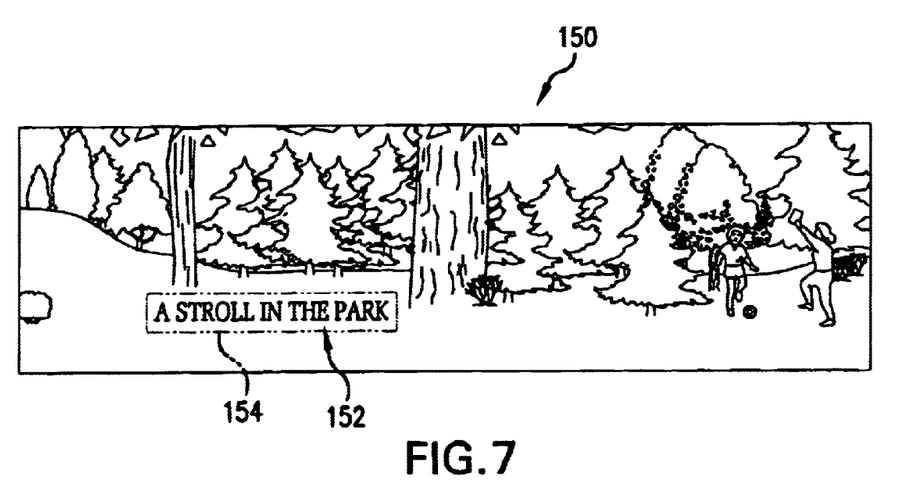
FIG. 7 is a drawing showing a photograph.
Figure 8:
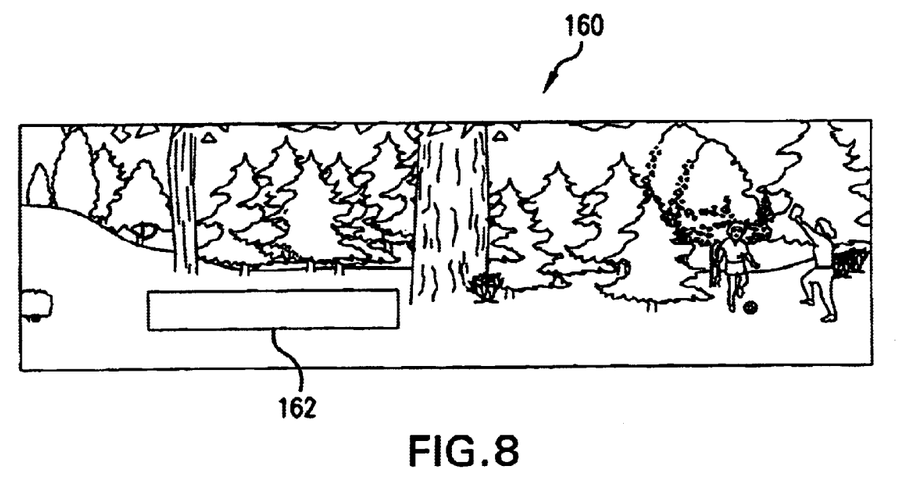
FIG. 8 is a drawing showing the photograph of FIG. 7 including textual material provided with the photograph.

The displayable text marker is illustrated in Table IV. The displayable text marker stores the display attributes of a piece of text and is basically a superset of the non displayable marker since it contains all of the information contained in Table III as well as all of the information contained in Table IV. The main difference between Table III and Table IV is that Table IV also contains the display attributes of the text. Furthermore, if the text is to be embedded to the photograph, the displayable text marker would store the bits of the picture before any overlay is created. This is important so that the photograph and the textual material may be edited subsequent to the compilation of the JPEG file as well as rebuilding the photograph created before the overlay, if this is necessary. The RGBBits store the bits of the picture area being overlayed. These are the pixels of the picture which has been eliminated from the photograph when textual material is embedded therein. This is illustrated in FIGS. 7 and 8 which show a typical photograph. The photograph 150 shown in FIG. 7 contains the phrase "A Stroll in the Park" 152 provided within a rectangle 154. The photograph 160 in FIG. 8 eliminates the phrase "a stroll in the park" which is not contained in the rectangle 162. Consequently, if the picture 150 was edited to eliminate the phrase "A Stroll in the Park", the pixels of the picture which were overlayed by that particular phrase would now be included in their proper location within the rectangle 162. Consequently, by storing the information in RGBBits whenever the text needs to be edited, the pixels are simply reloaded without the text in a process called decomposing as will be subsequently explained. Finally, if the textual material is to be embedded into the photograph, using a process called composing as will be further explained, the pixels with the newly edited text are then reinserted into the picture.

TABLE IV

| Data Item | Data Type | Description |
| --- | --- | --- |
| TextColor | Color | Color of Text |
| FontLen | Word | Length of the font type |
| FontName | Char | Font |
| FontSize | Word | Size of the font |
| FontStyle | Word | Style of font Bold, Underline, etc. |
| Position | Rect | x, y, w, h of the location in the picture that this text will be displayed |
| xyRotation | Word | x, y degrees to rotate the text |
| zRotation | Word | Rotation of the text around the z axis |
| RGBBitsLen | Word | Length of the RGB bits string |
| RGBBits | Byte | Bits of the picture area being overlayed |

Figure 4:
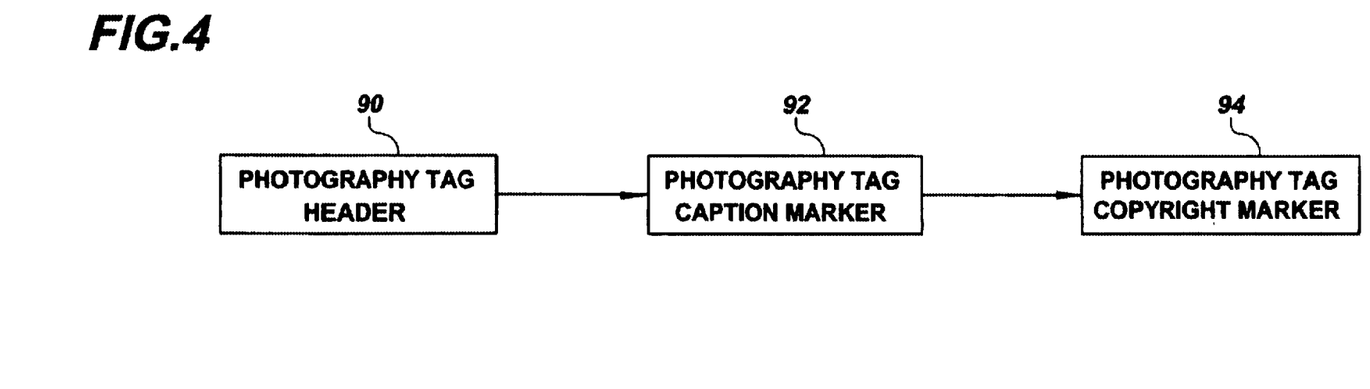
FIG. 4 is a block diagram showing the JPEG file loaded into a memory.

Referring to FIG. 4, the photography tag application is loaded into the memory of one of the computers 12, 14 or the camera 10, cell phone or any other memory device so that the appropriate textual material can be created and appended to the JPEG file. This data could also be modified by an authorized user as will be described. Each of the type of data included in the memory will be connected as a link list, whereby the photography tag header 90 points to the photography tag caption marker 92 which in turn points to the photography tag copyright marker 94. As can be appreciated, other types of textual material would operate in the same manner such as the photographer's name, a time stamp as well as a sound commentary. Therefore, referring to Table II, in order to retrieve the data in the copyright marker 94, one would begin with the pointer to the first marker and then go to the pointer of the next marker in line. Once a particular marker is loaded, it then will be possible to access and edit all of its attributes. For example, to read the copyright notice, one would traverse all of the nodes to get to the copyright tag and then load the text string from the copyright tag.

Figure 5:
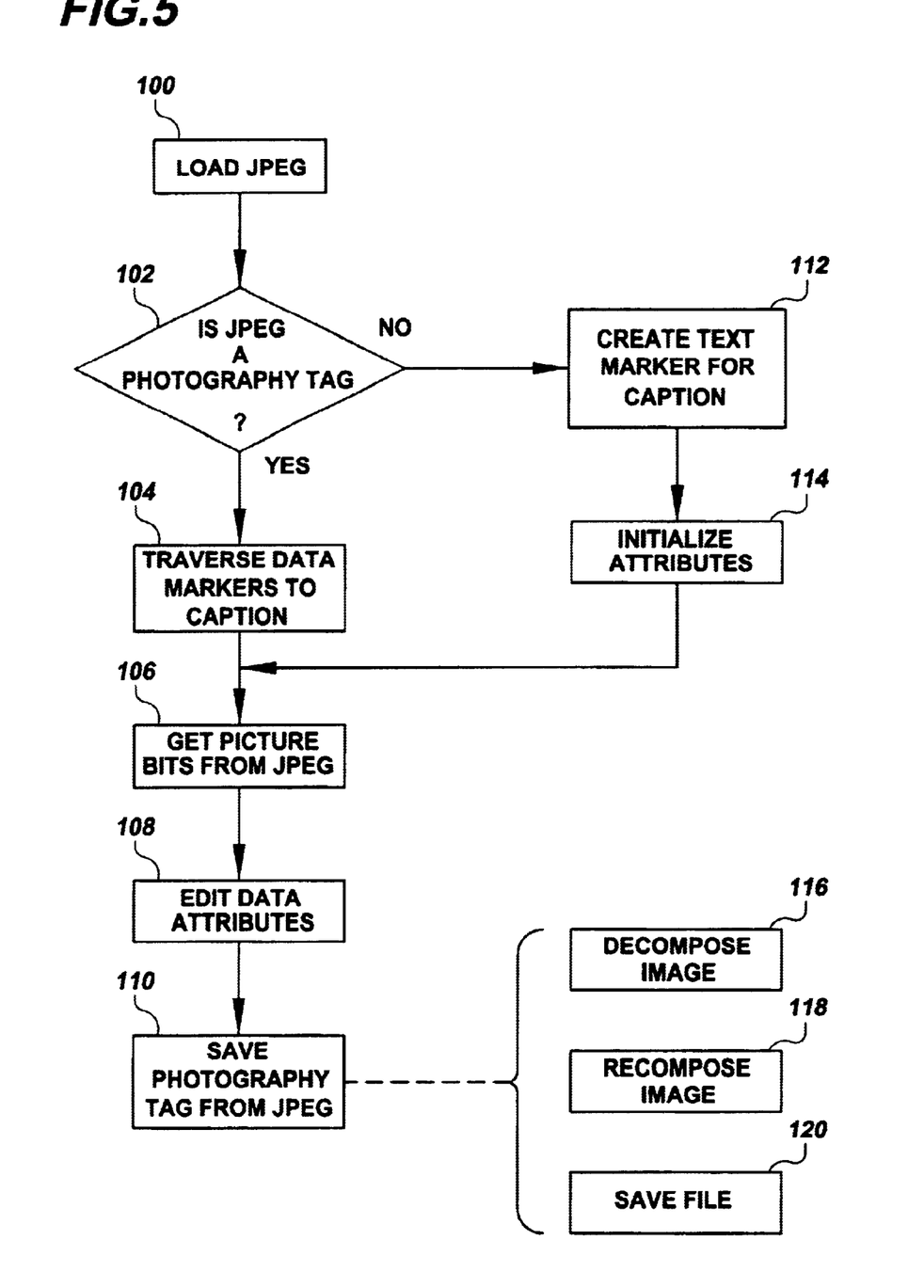
FIG. 5 is a flow chart showing the process of editing a text data marker.

The present invention utilizes a software developing kit which is loaded in both the device in which the JPEG file including the textual material is created or compiled as well as the device in which the complete JPEG file including the textual material would be sent. Initially, as illustrated in FIG. 5, a JPEG file would be loaded into the device which could be a camera, computer, cell phone or similar implement. The photography tag software would then check whether the JPEG file has any of the photography tag markers inside the file. If this is the case, the header marker 80 (see FIG. 3) is then located which points to the first tag which in turn points to the next tag as previously described. If there is no photography tag marker in the JPEG file at step 100 or 102, the proper markers are created as shown in steps 112, 114. This is accomplished by calling a create marker having the ability to produce a new caption including all of the types of textual materials described previously. Once the marker has been created, it is then possible to set all of the particular attributes such as the position of the caption, the type of fonts, the color of the font, etc.

If a JPEG file is loaded having the proper markers, all of the data markers are loaded into a memory as shown in step 104. This is true whether the JPEG file has all of the markers therein when it is loaded or whether the markers have recently been created. At this point, it is now possible to gain access to each of the data markers. It is now also possible to obtain all of the picture bits of the bit map located in the JPEG file so that the picture can be displayed on a screen as illustrated by step 106. At this point, any of the data attributes provided in the data marker can be edited as step 108. As will be subsequently explained, this edit step can only be accomplished if the potential editor has entered the proper password. After all of the data attributes have been reviewed and edited, if necessary, the JPEG file will now be saved as step 110.

The process of saving the photography tag file is accomplished by initially decomposing the image at step 116 in which the actual photograph is decomposed and then rebuilt, eliminating the photography tag inside of the JPEG file. This means that the end of the decomposition step 116 the photograph would be as if it returned to its original pre-captioned state. This is important since all of the textual data must be rebuilt within the photograph after it has been edited.

The method of decomposing would initially include the step of traversing through all of the data marker nodes. For each node, the RGBBits attribute is obtained. These bits are the original picture pixels of the area that the text is currently overlaying. If there is no overlay, this step would not be necessary. For each RGBBit it has to be re-overlayed on top of the rectangle position (a second attribute in Table IV). This step would effectively erase the pixels that have the text of the marker and would return the original rectangle pixels that were included before the text overlay. This step must be done for all of the text markers that have been created in the photography tag JPEG file.

At this point, as indicated by step 118, after all of the old data has been removed and the image returned to its original pre-photography tag state, the picture must be recomposed. This means that all of the text markers must be rebuilt into the picture. This is accomplished by traversing to all of the data marker nodes and, for each node, the proper rectangle position must be extracted in the picture where the text is to be overlayed. This is produced by extracting the original pixel bits from the photograph that was decomposed and saved in the RGBBit attribute in the text marker. The text string, font, color, etc. from all of the attributes are then written into the picture. Therefore, since the portion of the picture behind the textual material was saved, the original picture can always be reconstructed. This process must be accomplished for all of the text markers created in the photography tag JPEG file. Finally, the recomposed image is saved as step 120 by saving the picture pixels of the JPEG, saving the photography tag data markers, saving the photography tag header and then rewriting the EOI marker. At this point, the produced JPEG file including the textual material can be transmitted to various devices as shown in FIG. 1.

As previously indicated, the present invention allows the transference and editing of a JPEG file including textual material. However, to insure that only authorized individuals can edit this material, the photography tag software includes a security mechanism allowing the creator of the JPEG file to protect the data inside the file from being modified without permission of the creator. This security system would also decide which photography tags will be viewed on the picture as well as how they will be viewed.

Figure 6:
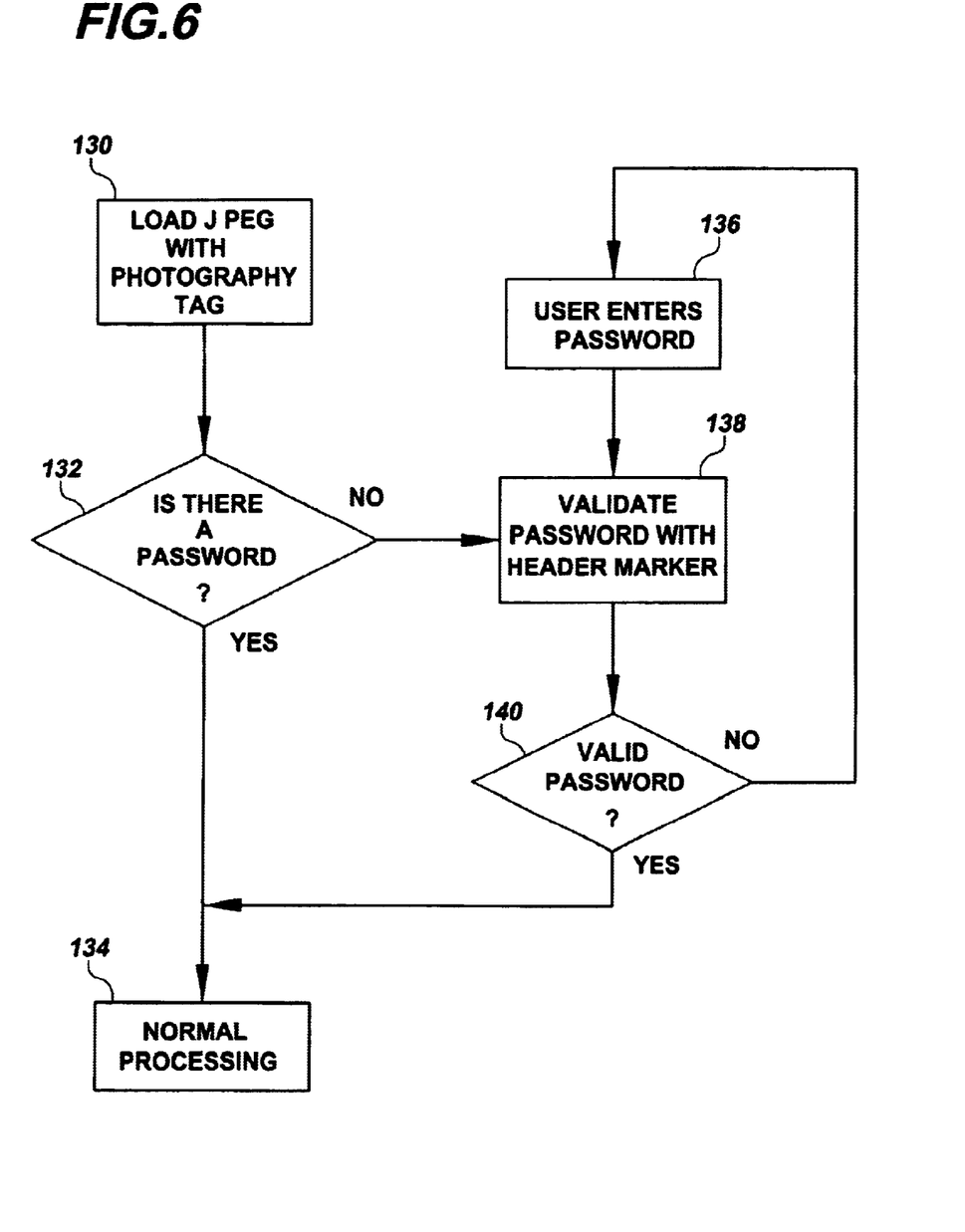
FIG. 6 is a block diagram showing the operation of editing a photograph tag.

The security aspect of the present invention operates since the header marker as illustrated in Table II includes a password. Therefore, as shown in FIG. 6, when the JPEG with a photography tag is loaded into one of the devices shown in FIG. 1, at step 130, a check would be made at step 132 to determine whether a user at step 136 entered a password. Unless a valid password is entered, all editing operation would be halted. The software, at step 138, would check to insure that a validated password as contained in the header marker was entered by the user. If this was not the case, the user would have another opportunity to enter a valid password. If a valid password is not entered after predetermined attempts, no editing would be allowed. If, however, at step 140 a valid password was entered, normal editing processing at step 134 would be enabled.

Furthermore, as previously indicated, the software of the present invention can be composed in a manner allowing a first individual to edit all of the non-photographic material included in the JPEG file, but preventing a second individual from modifying some of this data, but allowing this second individual to change other sections of the data. This is accomplished by including more than one password as shown in Table II and illustrated in FIG. 6. Based upon the assignment of different passwords to different individuals, full or limited access would be given for the purpose of editing the non-photographic material on the JPEG file. Finally, the application could be formulated preventing any editing of some of the data, such as the time stamp.

It will be appreciated that, although an embodiment of the present invention has been described in detail for purposes of illustration, various modifications may be made without departing from the spirit and scope of the invention. Therefore, the invention is not to be limited except as by the appended claims.

What is claimed is:

1. A method for creating an augmented media file, comprising the steps of:
   creating an original digital photograph having a plurality of n digital pixels said plurality of n digital pixels including a first section within said n digital pixels containing m digital pixels;
   transferring said original digital photograph to a first storage device provided in a first microprocessor provided with a first data entry device;
   editing said original digital photograph using said data entry device by replacing said first section containing m digital pixels with a second section of m digital pixels of non-photographic material, thereby producing an altered digital photograph; and
   creating an augmented media file by storing said altered digital photograph and said first section of digital pixels as a single file, wherein said first section is stored within photographic tag markers appended to said altered digital photograph.

2. The method of creating an augmented media file in accordance with claim 1, including the step of transferring said augmented media file to a second storage device provided in a second microprocessor provided with a second data entry device.

3. The method of creating an augmented media file in accordance with claim 2 wherein the entering of at least one of said password is used to edit said textual material.

4. The method of creating an augmented media file in accordance with claim 1, further including the step of inserting at least one password in said photographic tag markers, allowing an authorized individual to edit said textual material.

5. The method of creating an augmented media file in accordance with claim 4, further including the step of inserting at least two dissimilar passwords in said photographic tag markers, allowing disparate individuals to edit different portions of said textual material.

6. The method in accordance with claim 1, further including the step of storing said second section of m digital pixels within said photographic tag markers appended to said altered digital photograph.

7. An augmented media file for displaying an altered photograph on a display device, the altered photograph originally containing a plurality of n digital pixels used to create an original photograph, the n digital pixels including a first section within the n digital pixels containing m digital pixels, the augmented media file comprising:

the altered photograph with the first section containing m digital pixels replaced with a second section of m digital pixels of non-photographic material; and photographic tag markers affixed to said altered photograph to create the augmented media file, said photographic tag markers further including the first section of m digital pixels, wherein said altered photograph and said photographic tag markers form a single augmented media file.

8. The augmented media file in accordance with claim 7, said altered photograph including additional non-photographic material appended to the borders of the photograph and said photographic tags also including said additional non-photographic material.

9. The augmented media file in accordance with claim 7, further including non-photographic sound material attached to the augmented media file.

10. The augmented media file in accordance with claim 7, wherein said photographic tag markers include a header marker provided with information relating to the first section containing m digital pixels and said second section containing m digital pixels.

11. The augmented media file in accordance with claim 10, wherein said header marker is provided immediately in front the end of image (EOI) tag included in standard JPEG files.

12. The augmented media file in accordance with claim 7, wherein one of said photographic tag markers includes a password allowing an authorized individual to edit said non-photographic material.

13. The augmented media file in accordance with claim 12, wherein one of said photographic tag markers includes at least two dissimilar passwords allowing disparate individuals to edit different portions of said non-photographic material.

14. The augmented media file in accordance with claim 13, wherein one of said photographic tag markers is a header marker in which said password is stored.

15. The augmented media file in accordance with claim 12, wherein one of said photography tag markers is a header marker in which said passwords are stored.

16. The augmented media file in accordance with claim 7, wherein said photographic tag markers further includes said second section of m digital pixels.

17. The augmented media file in accordance with claim 7, wherein said augmented media file is a JPEG file.

18. A system for creating an augmented media file containing both a photograph and non-photographic material in a single file, comprising:

a camera producing an original digital photograph containing n digital pixels;

a means for transferring said original digital photograph to a first storage device including a first microprocessor having a first display, said original digital photograph including a first section containing m digital pixels, said original digital photograph creating a media file within said first storage device;

a first data input device connected to said first microprocessor for replacing said first section of said digital photograph with a second section of m digital pixels of non-photographic material thereby producing an altered digital photograph; and a device for creating an augmented media file, said augmented JPEG file including said altered digital photograph with said second section of m digital pixels replacing said first section of m digital pixels, said augmented media files including photographic tag markers said photographic tag markers including said first section of m digital pixels, wherein said altered photograph and said photographic tag marker form a single augmented media file.

19. The system in accordance with claim 18, further including a device for inserting a password in said photographic tag markers allowing an authorized individual to edit said non-photographic material.

20. The system in accordance with claim 19, wherein said device for inserting a password inserts at least two dissimilar passwords into said photographic tag markers allowing disparate individuals to edit different portions of said non-photographic material.

21. The system in accordance with claim 18, wherein said photographic tag markers further includes said second section of m digital pixels.

22. The system in accordance with claim 18, wherein said augmented media is a JPEG file.

23. The system for creating an augmented media file in accordance with claim 18, further including a means for transferring said entire augmented media file to a second storage device provided in a second microprocessor.

24. The system for creating an augmented media file in accordance with claim 23, wherein said first and second microprocessors are provided with a means for searching said augmented media file for terms included in said non-photographic material.

25. The system for creating an augmented media file in accordance with claim 18, further including a second data input device allowing a user to edit said augmented media file using said second data input device.

26. The system for creating an augmented media file in accordance with claim 18, wherein said non-photographic material is audio.

27. The system in accordance with claim 18, wherein said non-photographic material is textual material.

28. The system in accordance with claim 27, wherein said textual material is provided along at least one border of said altered digital photograph.

* * * * *